A. S. HALL.
MUD GUARD FASTENER.
APPLICATION FILED AUG. 15, 1911.
1,024,934. Patented Apr. 30, 1912.
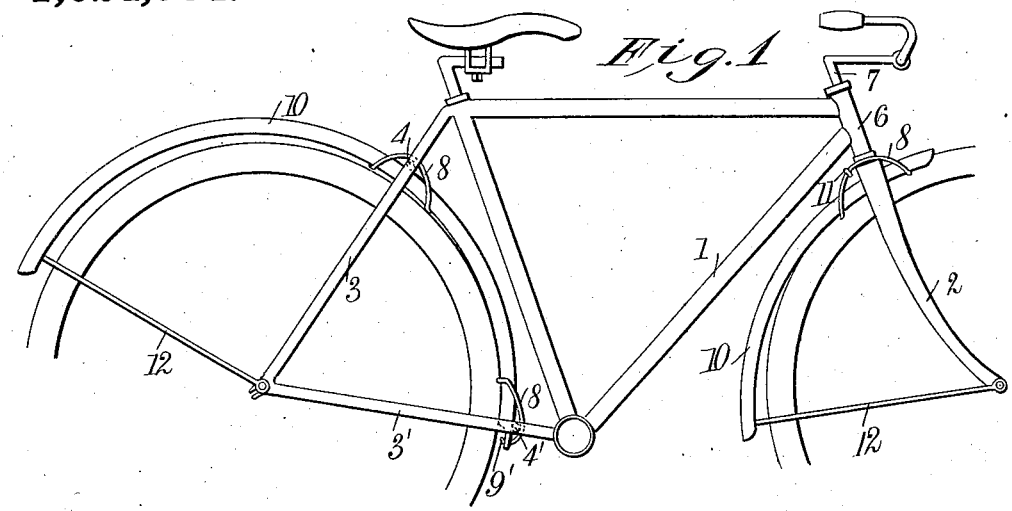
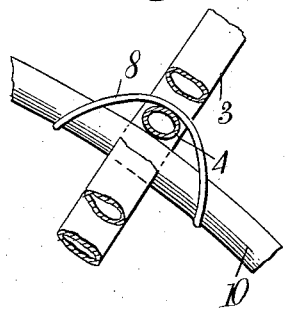
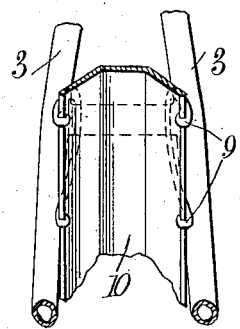
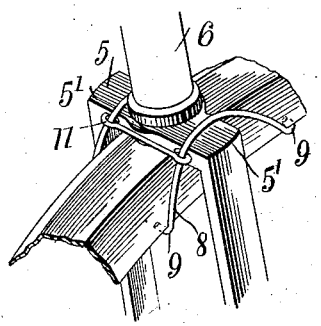
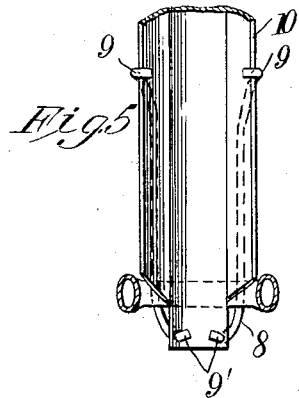
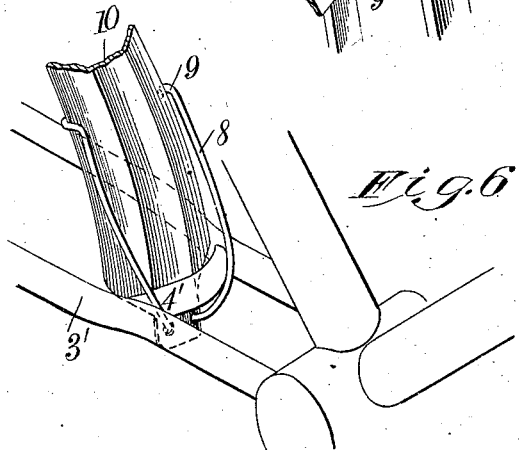
WITNESSES
F. E. Alexander
Wm. F. Nickel
INVENTOR
Allen S. Hall
BY
Munn & Co
ATTORNEYS

UNITED STATES PATENT OFFICE.

ALLEN SHEUMAN HALL, OF KOKOMO, INDIANA.

MUD-GUARD FASTENER.

1,024,934.   Specification of Letters Patent.   Patented Apr. 30, 1912.

Application filed August 15, 1911. Serial No. 644,096.

*To all whom it may concern:*

Be it known that I, ALLEN S. HALL, a citizen of the United States, and a resident of Kokomo, in the county of Howard and State of Indiana, have invented a new and Improved Mud-Guard Fastener, of which the following is a full, clear, and exact description.

My invention relates to improvements for fastening mud guards to the frames of bicycles and other vehicles on which they are used; and it comprises a fastener made of strong resilient material, so designed as to engage part of the frame of the vehicle at one point and the mud guard at other points, to secure the guard in proper position.

The object of my improved fastening means is to dispense with the use of bolts, to obviate the necessity of boring holes in the frame of the vehicle, and to facilitate the ready mounting of the mud guard by any one wishing to use the same, without the need of using boring tools and with the least possible expenditure of time and trouble.

Reference is to be had to the accompanying drawings forming a part of this specification, in which the same characters of reference indicate the same parts in all the views.

Figure 1 is a side elevation of a part of a bicycle, showing my fastening means holding the front and rear mud guards in position thereon; Fig. 2 is a vertical section taken through the cross-brace on the upper rear fork of the bicycle frame, showing the manner in which my fastening means is attached; Fig. 3 is a rear elevation of the parts shown in Fig. 2; Fig. 4 is a perspective view of the base of the front fork of the bicycle, showing how my improved fasteners hold the forward mud guard in place; Fig. 5 is a vertical section taken through the lower fork of the bicycle frame adjacent the forward end of the rear guard, showing the manner of attachment of the fastening means at this point; and Fig. 6 is a perspective view seen from the front of the part shown in Fig. 5.

On the drawings the numeral 1 indicates the frame of a bicycle of the common type having a front fork or yoke 2, in the lower ends of which are formed the bearings for the axle of the front wheel; and 3 and 3' are the upper and lower rear forks or yokes, which are joined together at their outer ends to form the bearings for the axle of the rear wheel. 4 is a cross-brace for the upper fork 3; and 4' is a similar cross-brace for the lower fork 3'. The front fork or yoke 2 has a base 5, forming a support for the bearing 6, through which passes the steering shaft 7, which is controlled by the handle bars, this shaft 7 being rigidly united to the base 5 of the forward fork 2, and mounted to turn in the bearings 6 in the usual way. The base 5 of the upper fork 2 is so formed as to present a pair of shoulders 5' on either side of the bearings 6.

My improved fastening means are shown at 8, and each consists of a bent or bowed piece of metal of suitable size and shape, at the extremities of which are formed hook members 9. The mud guards are represented at 10; and these guards are secured in place by the fasteners 8, by causing the hooks thereof to engage the edges of the mud guards and the body of the fasteners at a point intermediate the ends, to engage with the frame. For example, I use a pair of fasteners 8 to engage the cross-brace 4 of the upper rear fork 3, in such a way that this cross-brace will pass under the fasteners 8, and the hook ends 9 of the fasteners 8 will engage the edges of the mud guard 10. The fasteners 8 are put in place by being bent around the top of the cross-brace 4 a sufficient extent to allow the hook ends 9 to slip under the edges of the mud guard, so that when the fasteners are released their elasticity will force the hooks into tight engagement with the edges of the guard and hold the same securely in position.

To coöperate with the fasteners 8 engaging the cross-brace 4 and hold the rear mud guard 10 in place, I use a pair of fasteners 8 to secure the forward end of the guard 10 by bending the same around the cross-brace 4' of the lower fork 3'. The fasteners 8 at this point have hooks 9 at their upper ends, but their lower ends are preferably bent to form hooks 9', which pass through apertures in the end of the guard. Notches may of course be used instead of apertures; or the forward end of the guard may be shaped in any other way to cause the hooks 9', or similar hooks, to engage it securely. These fasteners are bent around the front of the cross-brace 4' when the guard is being put on, so as to force the upper hooks 9 past the edges of the guard; and when released, the elasticity of the fasteners will force the hooks into firm engagement with the mud guard edges.

To secure the forward mud guard on the frame of the bicycle or other vehicle I employ a pair of fasteners 8 which are bent around the shoulders 5' of the forward yoke 2, the hooks 9 engaging the edges of the mud guard in the usual way. The two fasteners at this point are connected by a link 11, to prevent them from slipping off the shoulders 5'.

The usual rods 12 are employed to engage the rear ends of the forward and rear mud guards 10, these rods being connected to the lower ends of the forward fork 2, and the rear ends of the forks 3 and 3'.

From the above description it will be obvious that with the use of my improved mud guard fasteners the mud guard can be attached in position by any one without the use of special tools and without the necessity of boring a hole in the frame, as has heretofore been done. The rods 12 form part of the mud guard and can be attached at their outer ends to the yokes 2 and 3 by simply screwing on a nut; and the fasteners 8 can be put on by hand by any one desiring to use them.

Having thus described my invention, I claim as new and desire to secure by Letters Patent:

1. A fastener for vehicle mud guards, comprising resilient means having hook portions formed at its opposite ends, said means adapted to be bent around a portion of the frame of the vehicle to bring the hook portions in position to engage the mud guard.

2. A fastener for vehicle mud guards, comprising elongated resilient means having hooks formed at the opposite ends thereof, said resilient means being adapted to be bent around a part of the frame of the vehicle to bring the hook ends into position to engage the edges of the mud guard.

3. A fastener for vehicle mud guards, comprising resilient means having a hook portion formed at one end adapted to be passed through an aperture adjacent the end of the mud guard, and having a hook portion formed at its opposite end, said resilient means being adapted to be bent around a portion of the frame adjacent the end of the mud guard to be secured, to bring said last-named hook into engagement with the edges of the mud guard.

4. A fastener for vehicle mud guards, comprising a pair of resilient means having hook portions formed adjacent their ends, said means adapted to be bent around a part of the frame of the vehicle to bring the hook portions into engagement with the edges of the mud guard, to hold the guard securely in position, and a link connecting said fasteners together.

In testimony whereof I have signed my name to this specification in the presence of two subscribing witnesses.

ALLEN SHEUMAN HALL.

Witnesses:
 D. L. DUKE,
 J. A. MYERS.

Copies of this patent may be obtained for five cents each, by addressing the "Commissioner of Patents, Washington, D. C."